United States Patent [19]

Poor

[11] Patent Number: 5,378,354

[45] Date of Patent: Jan. 3, 1995

[54] ARTICLE/LIQUID SEPARATOR

[75] Inventor: James C. Poor, East Granby, Conn.

[73] Assignee: The Spencer Turbine Company, Windsor, Conn.

[21] Appl. No.: 150,387

[22] Filed: Nov. 9, 1993

[51] Int. Cl.⁶ .......................... B01D 29/01; A47L 7/00
[52] U.S. Cl. .................................. 210/188; 210/238;
 210/250; 210/456; 210/474; 210/482; 210/498;
 55/219; 55/421; 55/465; 55/DIG. 3; 15/353;
 15/320; 15/321
[58] Field of Search ............... 210/188, 238, 232, 456,
 210/250, 474, 482, 498; 55/219, 421, 465, DIG.
 3; 15/353, 320, 321

[56] References Cited

U.S. PATENT DOCUMENTS

| | | |
|---|---|---|
| 1,192,265 | 7/1916 | Bird .................................. 210/498 |
| 1,316,442 | 9/1919 | Goughnour . |
| 3,431,582 | 3/1969 | Grave . |
| 3,896,520 | 7/1975 | Williams . |
| 3,996,640 | 12/1976 | Blue . |
| 4,023,233 | 5/1977 | Prestwich . |
| 4,080,104 | 3/1978 | Brown . |
| 4,095,398 | 6/1978 | Anmann . |
| 4,164,055 | 8/1979 | Townsend . |
| 4,295,244 | 10/1981 | Herpers . |
| 4,348,783 | 9/1982 | Swanson . |
| 4,377,017 | 3/1983 | Herpers . |
| 4,464,810 | 8/1984 | Karpanty . |
| 4,466,155 | 8/1984 | Grave . |
| 4,561,866 | 12/1985 | Altman . |
| 4,608,062 | 8/1986 | Hughes . |
| 4,741,069 | 5/1988 | Helm . |
| 4,801,376 | 1/1989 | Kulitz . |
| 4,976,850 | 12/1990 | Kulitz .................................. 15/353 |
| 5,032,155 | 7/1991 | Wiese . |
| 5,086,537 | 2/1992 | McDowell . |
| 5,263,225 | 11/1993 | Winters . |

FOREIGN PATENT DOCUMENTS

| | | |
|---|---|---|
| 584806 | 10/1959 | Canada . |
| 527354 | 10/1940 | United Kingdom . |
| 2131712 | 12/1983 | United Kingdom . |
| 93/03217 | 2/1993 | WIPO . |

Primary Examiner—Thomas M. Lithgow
Attorney, Agent, or Firm—McCormick, Paulding & Huber

[57] ABSTRACT

An apparatus for recovering liquid from liquid contaminated small articles of manufacture has a housing which defines upper and lower chambers separated by an inclined perforated plate. A vacuum producer withdraws air from the housing causing liquid contaminated articles discharged from a production machine to be drawn into the housing through a flexible suction hose. Liquid contaminated articles entrained within the incoming airstream enter the housing, strike a target plate, and drop onto the perforated plate. Liquid drains from the articles, passes through the perforated plate, accumulates in a sump in the lower portion of the housing and is pumped to a recovery station. An access opening in the housing facilitates removal of the articles from the housing.

11 Claims, 1 Drawing Sheet

ARTICLE/LIQUID SEPARATOR

BACKGROUND OF THE INVENTION

This invention relates in general to separating apparatus and deals more particularly with a solid/liquid separator for separating and recovering liquid from articles coated with a liquid.

Machining and heading operations employed in the manufacture of small articles, as, for example, rivets and threaded fasteners, normally require relatively large quantities of liquid lubricants or coolants which generate mist at the point of machine operation and contaminate the work place. Such liquid lubricants and coolants tend to cling to finished work pieces which may be discharged from machines directly into tote boxes or barrels for further processing or handling resulting in further work place contamination.

Accordingly, it is the general aim of the present invention to provide an improved article/liquid separator for separating liquid from liquid contaminated articles and recovering the liquid contaminant for recycling or proper disposal. It is a further aim of the invention to provide a liquid/article separator for collecting liquid contaminated articles from a machine at a discharge location near the point of operation of the machine and for controlling mist generated at the point of operation.

SUMMARY OF THE INVENTION

In accordance with the invention an apparatus for separating liquid from liquid contaminated articles comprises a housing which has an upper chamber and a lower chamber which includes a sump. An article supporting means disposed within the housing partially defines the upper chamber and the lower chamber and permits passage of liquid from the upper chamber into the lower chamber while preventing articles from passing from the upper chamber into the lower chamber. Vacuum producing means withdraws air from the housing through the outlet opening which opens into the upper chamber. Suction means connected to the housing conveys liquid contaminated articles into the upper chamber through the inlet opening in the housing. Articles are removed from the upper chamber through an access opening in the housing proximate the article supporting means. Drain means connected to the housing in communication with the sump facilitates removal of liquid collected in the sump.

DETAILED DESCRIPTION OF PREFERRED EMBODIMENT

Figure 1:
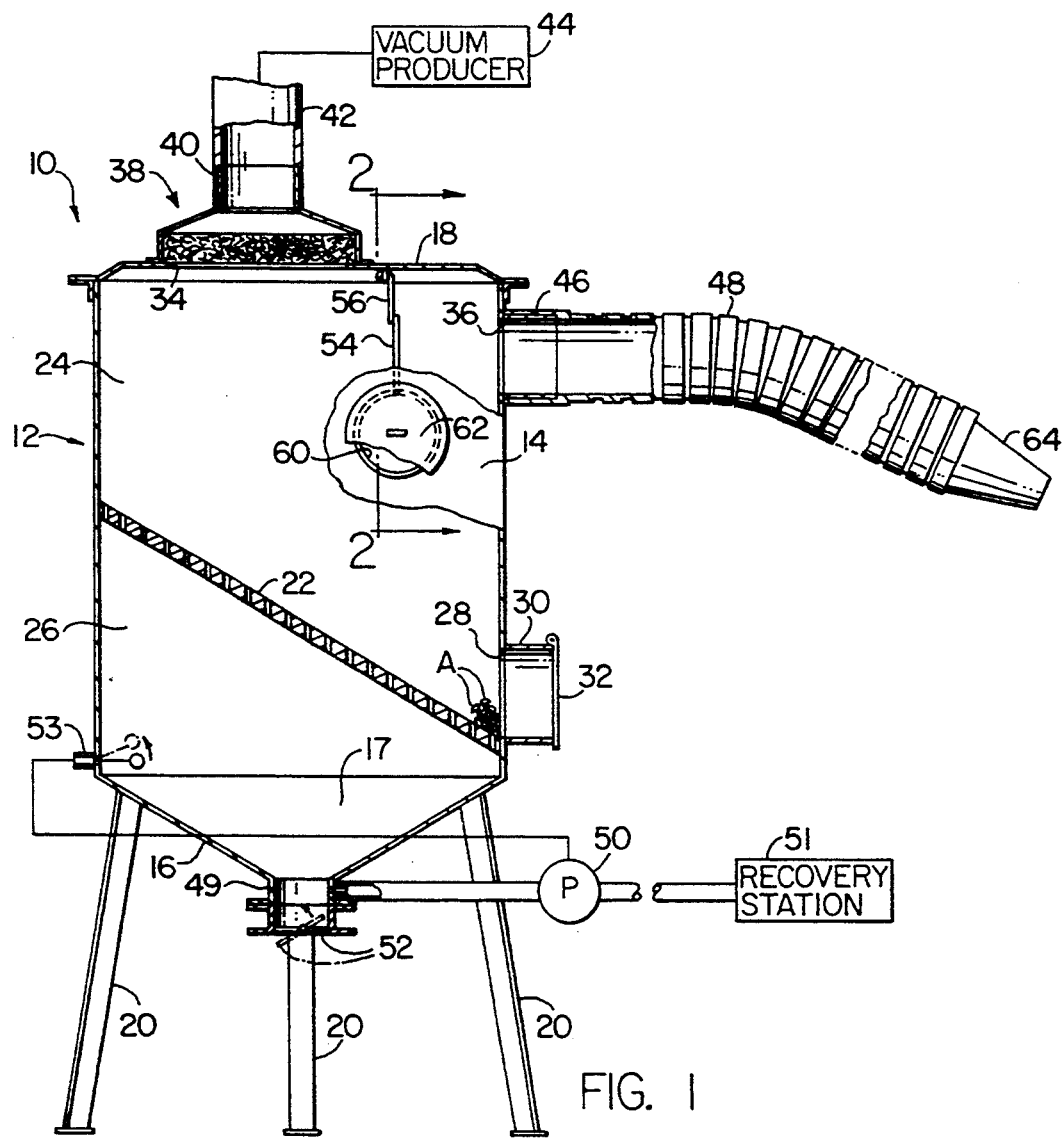
FIG. 1 is a side elevational view of an article/liquid separator embodying the present invention shown partially in axially vertical section.
Figure 2:
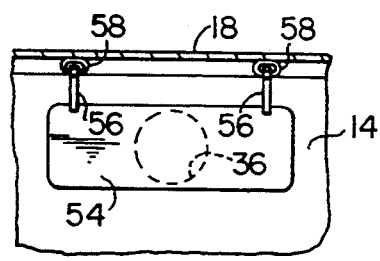
FIG. 2 is a somewhat enlarged sectional view taken generally along the line 2—2 of FIG. 1.

In the drawing and in the description which follows the present invention is illustrated and described with reference to an article/liquid separator indicated generally by the reference numeral 10. The separator 10 is particularly adapted to separate and recover liquid from liquid contaminated small articles of manufacture, such as rivets and threaded fasteners, and in FIG. 1 such typical small articles are indicated by the letter A.

The illustrated article/liquid separator 10 has a housing indicted generally at 12, preferably fabricated from metal, and includes a generally cylindrical side wall 14 and a downwardly converging generally frustoconical bottom wall 16 which defines a sump 17. A cover 18 releasably secured b to a radially outwardly directed annular flange at the upper end of the sidewall 14 by fasteners (not shown) forms a closure for the upper end of the housing 12. A plurality of legs 20, 20 welded or otherwise attached to the lower portion of the housing 12 support the housing in an axially vertically oriented position, substantially as shown.

A vertically downwardly inclined article support member or grid 22 extends across the interior of the housing 10 and separates an upper chamber 24 from a lower chamber 26. The grid partially defines the upper and lower chambers 24 and 26 and may take various forms but preferably, and as shown, it comprises a perforated plate, the lowermost portion of which is disposed proximate the junction of the sidewall 14 and the bottom wall 16. An access opening 28 formed in the sidewall 14 opens into the upper chamber 24 immediately above the lowermost end of the perforated plate 22 for a purpose which will be hereinafter further discussed. A short tubular housing extension 30 welded or otherwise secured to the sidewall 14 in alignment with the access opening 28 supports a hinged cover 32 which forms a closure for the latter access opening.

In accordance with the invention air outlet and inlet openings 34 and 36 open into the upper chamber 24. The illustrated outlet opening 34 is formed in the cover 18 and opens into the uppermost end of the upper chamber 24. Preferably, and as shown, a demister indicated generally at 38 is mounted on the cover 18 over the outlet opening 34 and includes a generally cylindrical outlet connector 40. An air outlet conduit or duct 42 attached to the outlet connector 40 and connected to a suitable vacuum source or vacuum producer 44, such as a centrifugal blower (not shown), facilitates withdrawal of air from the housing and through the demister 38.

The air inlet opening 36 is formed in the sidewall 14. A generally cylindrical tubular inlet connector 46 secured to the housing 14 in alignment with the opening 36 facilitates attachment of an inlet conduit or flexible suction hose 48 to the housing in communication with the upper chamber 24.

Liquid is preferably withdrawn from the sump 17 through a drain conduit 49 by a pump 50 for delivery to a recovery station 51. Operation of the pump 50 is controlled by a float switch 53 which, as shown, is mounted proximate the lower end of the sidewall 14. A cleanout or butterfly valve indicated generally at 52 and located at the lowermost end of the housing 12 has a closed or full line position and an open position indicated by broken lines.

Preferably, and as shown, a target plate is suspended within the housing 12 in the path of the incoming airstream which enters the housing through the inlet opening 36. The illustrated target plate indicated at 54 comprises a generally rectangular plate mounted on J-hooks 56, 56 engaged within eyes 58, 58 welded or otherwise secured to the inner surface of the cover 18. An access opening or handhole 60 opens through the sidewall 14 in the vicinity of the target plate for access to the target plate 54 to facilitate target plate replacement or servicing, as necessary. A removeable cover plate 62 forms a closure for the handhole 60.

The liquid/article separator 10 is particularly adapted for use with a machine for producing small articles such as the articles A, A, shown in FIG. 1. Such a production machine (not shown) requires a substantial quantity of lubricating and cooling liquid at the point of machine operation. Consequently, finished articles leave the machine in a substantially liquid saturated condition. The free end of the suction conduit or hose 48 is preferably positioned at or near the point of operation of the machine to receive the liquid contaminated articles as the articles are discharged from the machine. A suitable vacuum pick-up attachment, such as the illustrated attachment 64, may be provided on the free end of the suction hose 48 to capture the articles A, A as the articles leave the production machine.

Operation of a vacuum producer 44 creates a substantial negative pressure within the housing 12 causing liquid saturated articles and the liquid mist at the discharge end of the production machine to be drawn into the suction hose 48 and entrained within the airstream which flows through the hose and into the upper chamber 24.

Some liquid separation occurs as liquid coated articles entrained in the airstream move at relatively high velocity into the housing 12. Further liquid separation occurs as the articles strike the target plate 54. The resulting free droplets of liquid fall onto the perforated plate 22.

Air which flows from the housing 12 through the outlet opening 34 is constrained to pass through the demister Liquid particles entrained in the air stream collect within and are coagulated by the demister 38, drip from the demister onto the grid plate 22 and pass through the grid plate and into the sump 17. When the liquid within the sump 17 reaches a predetermined level the float switch 53 moves from its off or full line position to its broken line position to energize a drive motor (not shown) which operates the pump 50 to discharge liquid from the sump 17 to a suitable collection point or recovery station 51 for reclamation or proper disposal. The pump 50 is preferably arranged to operate until the liquid in the sump reaches a predetermined lower level at which time power supplied to the pump drive motor is interrupted.

The articles A, A which accumulate within the upper chamber 24 are removed from the housing through the access opening 28. Metal chips produced by the manufacturing operation and other foreign material and sludge which accumulate in the sump 17 may be removed by opening the butterfly valve 52 which may be connected to a discharge conduit (not shown) for conveying this waste material to a waste collector remote from the separator 10.

I claim:

1. Apparatus for separating liquid from liquid coated article and comprising a housing having an upper chamber and a lower chamber defining a sump, said housing having a sidewall, a top wall, and a bottom wall downwardly inclined from said sidewall, article supporting means disposed within said housing and partially defining said upper chamber and said lower chamber for permitting the passage of liquid from said upper chamber to said lower chamber and preventing passage of the articles from said upper chamber into said lower chamber and including a downwardly inclined perforated plate extending across said housing and separating said upper chamber from said lower chamber, said perforated plate having a lower portion disposed proximate said sidewall, an outlet opening communicating with said upper chamber, vacuum producing means for withdrawing air from said housing through said outlet opening and including a vacuum conduit for connection to a vacuum source through which air withdrawn from said housing is constrained to pass, demisting means for removing liquid from air withdrawn from said housing through said outlet opening, an inlet opening defined by said housing and opening into an upper portion of said upper chamber, suction conduit means connected to said housing at said inlet opening for the passage of liquid contaminated articles into said upper chamber through said inlet opening and including a flexible vacuum hose, a first access opening defined by said sidewall and opening into said upper chamber proximate the lower portion of said perforated wall for the removal of articles from said housing, a drain conduit connected to said housing in communication with said sump for removal of liquid from said sump, a pump connected to said drain conduit, sensing means mounted on said housing for operating said pump to discharge liquid from said sump when the liquid within said sump attains a predetermined level, and cleanout means for removing contaminate from said sump.

2. Apparatus for separating liquid from liquid contaminated articles as set forth in claim 1 wherein said sidewall comprises an axially vertical generally cylindrical wall and said bottom wall comprises a generally frustoconical wall and said sump is defined by said bottom wall.

3. Apparatus for separating liquid from liquid contaminated articles as set forth in claim 1 wherein said sensing means comprises a float switch.

4. Apparatus for separating liquid from liquid contaminated articles as set forth in claim 1 wherein said apparatus includes article arresting means supported within said upper chamber in the path of articles entering said chamber from said inlet opening for arresting movement in one direction of liquid coated articles entering the upper chamber through said inlet opening and causing the articles to drop onto said article supporting means.

5. Apparatus for separating liquid from liquid contaminated articles as set forth in claim 4 wherein said article arresting means comprises a target plate depending from said housing.

6. Apparatus for separating liquid from liquid contaminated articles as set forth in claim 5 including a second access opening defined by said housing and opening into said upper chamber proximate said target plate.

7. Apparatus for separating liquid from liquid contaminated articles as set forth in claim 1 wherein said top wall defines said outlet opening and said demisting means comprises a demister mounted on said top wall and through which air withdrawn from said housing is constrained to pass.

8. Apparatus for separating liquid from liquid contaminated articles as set forth in claim 1 wherein said cleanout means comprises a butterfly valve.

9. Apparatus for separating liquid from liquid coated articles and comprising a housing having an upper chamber and a lower chamber defining a sump, said housing having a generally cylindrical sidewall, a horizontally disposed top wall, and a frustoconical bottom wall, article supporting means disposed within said housing and partially defining said upper chamber and said lower chamber for permitting the passage of liquid from said upper chamber to said lower chamber and preventing passage of the articles from said upper chamber into said lower chamber and including a downwardly inclined perforated plate extending across said housing and having a lower portion disposed proximate the junction of said sidewall and said bottom wall, an outlet opening defined by said top wall and opening into said upper chamber, vacuum producing mean for withdrawing air from said housing through said outlet opening and including a vacuum conduit for connection to a vacuum source, a demister mounted on said top wall between said outlet opening and said vacuum conduit and through which air withdrawn from said housing is constrained to pass, an inlet opening defined by said housing and opening into the upper portion of said upper chamber, suction conduit means connected to said housing at said inlet opening for the passage of liquid contaminated articles such as aforesaid into said upper chamber through said inlet opening and including a flexible vacuum hose, a first access opening defined by said sidewall and opening into said upper chamber proximate the lower portion of said perforated wall for the removal of articles from said housing, draining means connected to said housing in communication with said sump for removal of liquid from said lower chamber and including a drain conduit, a pump connected to said drain conduit, float switch means mounted on said housing for operating said pump to discharge liquid from said sump when the liquid within said sump attains a predetermined level, and valve means at the lowermost level of said bottom wall for removing contaminate from said sump.

10. Apparatus for separating liquid from liquid coated articles as set forth in claim 9 including a target plate disposed within said upper chamber and depending from said top wall in the path of articles entering said upper chamber through said inlet opening.

11. Apparatus for separating liquid from liquid coated articles as set forth in claim 10 including a second access opening formed in said sidewall and communicating with said upper chamber proximate said target plate.

* * * * *